(No Model.)

W. S. WHITING.
GARMENT HOOK.

No. 455,080. Patented June 30, 1891.

WITNESSES:
P. H. Eagles.
L. Donville.

INVENTOR
William S. Whiting
BY
ATTORNEY.

UNITED STATES PATENT OFFICE.

WILLIAM S. WHITING, OF CAMDEN, NEW JERSEY, ASSIGNOR TO THOMAS DE Q. RICHARDSON, FRANK E. DE LONG, AND CHARLES F. DE LONG, ALL OF PHILADELPHIA, PENNSYLVANIA.

GARMENT-HOOK.

SPECIFICATION forming part of Letters Patent No. 455,080, dated June 30, 1891.

Application filed March 13, 1891. Serial No. 384,949. (No model.)

*To all whom it may concern:*

Be it known that I, WILLIAM S. WHITING, a citizen of the United States, residing in the city and county of Camden, State of New Jersey, have invented a new and useful Improvement in Garment-Hooks, which improvement is fully set forth in the following specification and accompanying drawings.

My invention consists of a garment-hook formed of a two-part shank, a hook continuous of said shank, and detaching eyes each continuous of one of the two parts of the shank, one of the parts of the shank being bent, forming a jaw which closes the space between the shank and the hook, as will be hereinafter set forth.

Figure 1:
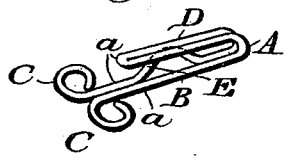
Figure 2:
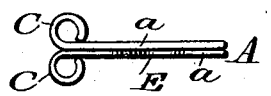
Figure 3:

Figure 1 represents a perspective view of a garment-hook embodying my invention. Fig. 2 represents a rear view thereof. Fig. 3 represents a side elevation thereof.

Similar letters of reference indicate corresponding parts in the several figures.

Referring to the drawings, A designates a garment-hook of the class of hooks and eyes, the same being formed of a continuous piece of wire, and consisting of the shank B, the attaching-eyes C, hook portion D, and jaw E. The shank consists of the two lengths or parts *a a*, with one end of each of which one of the eyes C is continuous. The other end of each of said parts *a* joins one of the pieces *b b*, composing the hook portion D. One of the lengths *a* of the shank is bent toward the hook portion D, thus forming the jaw E, which closes the space between the shank and said portion, said jaw, however, yielding when pressed by the engaging-eye and then closing, whereby the eye is controlled by said jaw until superior force is exerted on the latter to permit the eye to pass the same during removal thereof, it being noticed that the hook as constructed is more particularly designed for use where it is desired to have the jaw more rigid or less yielding than in hooks as heretofore known, as said jaw is continuous of the eye by which the device is attached to a garment or elsewhere.

Having thus described my invention, what I claim as new, and desire to secure by Letters Patent, is—

A garment-hook consisting of a shank formed of a piece of wire doubled upon itself, and with a hook proper continuous of said shank, one part of said shank being straight and the other part thereof formed with a vertical bend engaging said hook proper, the free ends of said shank being each formed into an eye, substantially as described.

WILLIAM S. WHITING.

Witnesses:
JOHN A. WIEDERSHEIM,
A. P. JENNINGS.